United States Patent Office 3,102,127
Patented Aug. 27, 1963

3,102,127
19-METHYLENE-ANDROSTANE DERIVATIVES
Albert Bowers, Mexico City, Mexico, assignor to Syntex Corporation, Panama, Panama, a corporation of Panama
No Drawing. Filed June 12, 1962, Ser. No. 201,763
20 Claims. (Cl. 260—397.4)

The present invention relates to novel cyclopentanophenanthrene compounds and a process for the production thereof.

More particularly the present invention relates to 19-methylene-androstane derivatives.

The novel compounds of the present invention are represented by the following formulas:

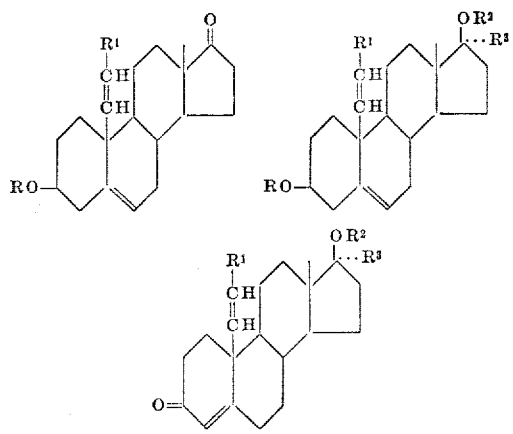

In the above formulas R and $R^2$ each represent hydrogen or a hydrocarbon carboxylic acyl group of less than 12 carbon atoms; $R^1$ represents hydrogen or a lower alkyl group; and $R^3$ represents hydrogen, lower alkyl, lower alkenyl or lower alkinyl.

The acyl group is derived from hydrocarbon carboxylic acids containing less than 12 carbon atoms which may be saturated or unsaturated, of straight, branched, cyclic or cyclic-aliphatic chain, aromatic and may be substituted by functional groups such as hydroxy, alkoxy containing up to 5 carbon atoms, acyloxy containing up to 12 carbon atoms, nitro, amino or halogen. Typical ester groups are the acetate, propionate, enanthate, benzoate, trimethylacetate, t-butylacetate, phenoxyacetate, cyclopentylpropionate, aminoacetate and β-chloropropionate.

The compounds represented by the above formulas exhibit anabolic-androgenic activity, and inhibit the produtcion of pituitary gonadotrophic hormones and A.C.T.H. In addition, they have anti-estrogenic properties and lower the blood, liver, and adrenal chlosterol levels. Furthermore, they are useful in the control of fertility and psychotic conditions and are appetite stimulants.

The novel compounds of the present invention are prepared by the process illustrated by the following equation:

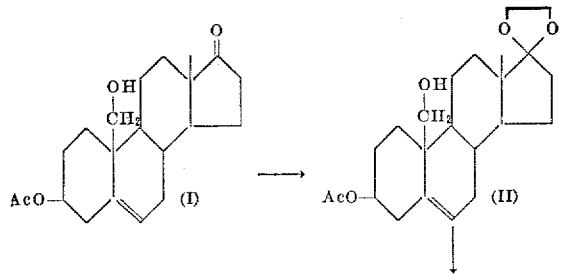

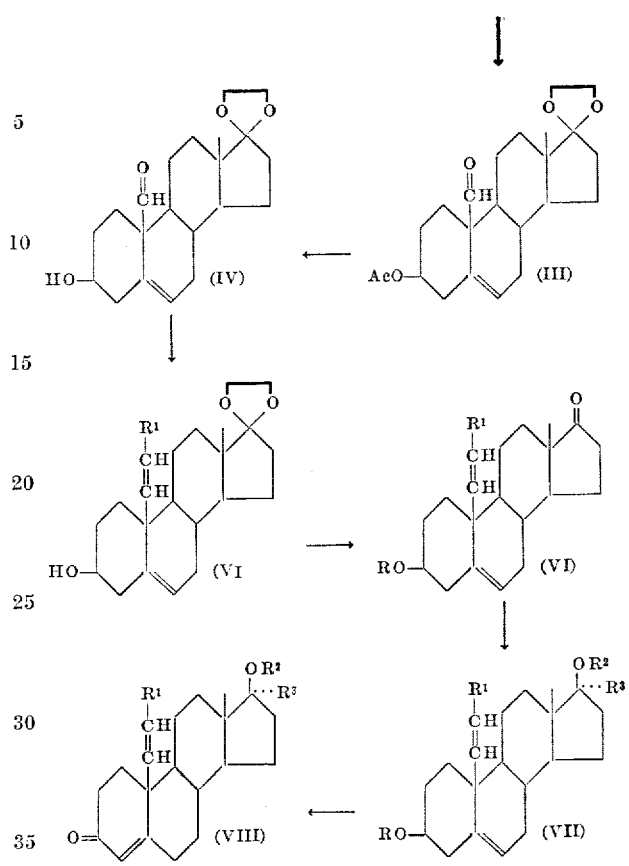

In the above formulas R, $R^1$, $R^2$ and $R^3$ have the same meaning as previously set forth.

In proceeding in accordance with the above equation the starting $\Delta^5$-androstene-3β,19-diol-17-one 3-acetate (I) is treated conventionally with ethylene glycol in the presence of p-toluenesulfonic acid to produce the 17-cycloethylenedioxy derivative thereof (II), which upon oxidation in a neutral or slightly basic medium, e.g. with chromium trioxide in pyridine yields 17-cycloethylenedioxy-$\Delta^5$-androsten-3β-ol-19-al acetate (III). Conventional saponification of the latter in a basic medium affords the corresponding 3-free alcohol (IV), which is treated with a triphenylphosphonium lower alkyl bromide, such as triphenylphosphonium (methyl or ethyl) bromide, in the presence of a lower alkyl lithium compound, preferably butyl lithium, in a solvent inert to the reagents, preferably ether, to give the corresponding 17-cycloethylenedioxy-18-methylene-$\Delta^5$-androsten-3β-ol derivative (V). The 17-cycloethylenedioxy grouping of the latter compound is conventionally hydrolyzed with acid, thus giving the corresponding 19-methylene-3β-ol-17-one compound (VI), which upon treatment with a lower (alkyl, alkenyl or alkinyl) magnesium halide, such as methyl, vinyl or ethinyl magnesium bromide, in a solvent inert to the reagent such as benzene, yields the corresponding 17α-lower (alkyl, alkenyl or alkinyl) 19-methylene-$\Delta^5$-androstene-3β,17β-diol derivative (VII: $R^3$=hydrocarbon). The 19-methylene-$\Delta^5$-androsten-3β-ol-17-one derivative (VI) is reduced preferably with sodium borohydride, to give the corresponding 19-methylene-$\Delta^5$-androstene-3β,17β-diol compound (VII: $R^2$=$R^3$=H).

The $\Delta^5$-androstene,3β,17β-diol derivatives of the present invention (VII), upon treatment under conventional Oppenauer conditions for approximately 15 minutes yield the corresponding $\Delta^4$-androsten-17β-ol-3-one derivatives (VIII).

The secondary hydroxyl groups of the compounds of the present invention, e.g. the 3β-hydroxyl group or the 17β-hydroxyl group of the 17α-unsubstituted compounds, are conventionally actylated in pyridine with an acylating agent, such as an anhydride derived from a hydrocarbon carboxylic acid of the type defined hereinbefore, to produce the corresponding acylates. The tertiary hydroxyl group of the compounds of the present invention, namely the 17β-hydroxyl group of the 17α-substituted compounds, is conventionally esterified in the presence of p-toluenesulfonic acid with an acylating agent of the type just defined, thus affording the corresponding 17β-esters.

The following specific examples serve to illustrate but are not intended to limit the scope of the present invention:

*Example I*

A mixture of 1 g. of the 3-acetate of $\Delta^5$-androstene-3β,19-diol-17-one (obtained in accordance with my copending U.S. patent application Ser. No. 194,716, filed May 14, 1962, now U.S. Patent No. 3,065,228) 25 cc. of dry benzene, 5 cc. of ethylene glycol and 50 mg. of p-toluenesulfonic acid monohydrate was refluxed for 16 hours using a water separator. It was then washed with a sodium bicarbonate solution, water and subsequently dried and evaporated to dryness. Recrystallization from acetone-hexane yielded 17-cycloethylenedioxy-$\Delta^5$-androstene-3β,19-diol 3-acetate.

*Example II*

A solution of 6 g. of the latter compound in 120 cc. of pyridine was added to a mixture of 6 g. of chromic trioxide in 120 cc. of pyridine. The reaction mixture was kept at room temperature overnight. It was then diluted with ethyl acetate, filtered through celite and the filtrate washed well with water, dried and evaporated to dryness. Crystallization from acetone-hexane afforded 17 - cycloethylenedioxy - $\Delta^5$ - androsten - 3β - ol - 19 - al acetate.

*Example III*

2 g. of the latter acetate dissolved in 50 cc. of methanol and treated with 5 cc. of a 4% aqueous solution of potassium hydroxide; the reaction mixture was stirred for 1 hour under an atmosphere of nitrogen at 0° C.; the mixture was neutralized with acetic acid and the methanol distilled under reduced pressure. The residue was triturated with water and the solid collected, washed with water, dried and recrystallized from ethyl acetate-methanol, thus producing 17-cycloethylenedioxy-$\Delta^5$-androsten-3β-ol-19-al.

*Example IV*

A suspension of 14.5 g. of triphenylphosphonium methyl bromide in 250 cc. of anhydrous ether was treated, under an atmosphere of nitrogen, with 40 cc. of a 1 N ethereal solution of butyl lithium and the mixture was stirred for 2 hours at room temperature. A solution of 5 g. of 17-cycloethylenedioxy-$\Delta^5$-androsten-3β-ol-19-al, in 100 cc. of ether was then added dropwise in the course of 15 minutes and with stirring. The reaction mixture was stirred for 6 hours further and let stand at room temperature overnight. The ether was displaced with dry tetrahydrofuran by distillation and then refluxed for 8 hours. It was then cooled, diluted with water and extracted several times with ethyl acetate, the organic extract was washed with water, dried over anhydrous sodium sulfate and evaporated to dryness. Chromatography of the residue and recrystallization of the solid eluates from acetone-hexane gave 17-cycloethylenedioxy-19-methylene-$\Delta^5$-androsten-3β-ol.

*Example V*

Following the procedure described in Example IV, except that triphenylphosphonium methyl bromide, was substituted by triphenylphosphonium ethyl bromide, there was produced 17-cycloethylenedioxy-19-ethylidene-$\Delta^5$-androsten-3β-ol.

*Example VI*

A solution of 500 mg. of 17-cycloethylenedioxy-19-methylene-$\Delta^5$-androsten-3β-ol in 25 cc. of acetone was treated with 0.1 cc. of concentrated hydrochloric acid and the mixture kept at room temperature overnight. It was then poured into water, extracted with methylene chloride and the organic extract washed with water to neutral, dried over anhydrous sodium sulfate and evaporated to dryness. Crystallization from acetone-hexane gave 19-methylene-$\Delta^5$-androsten-3β-ol-17-one.

Following the same procedure, 17-cycloethylenedioxy-19-ethylidene-$\Delta^5$-androsten-3β-ol was converted into 19-ethylidene-$\Delta^5$-androsten-3β-ol-17-one.

*Example VII*

A solution of 5 g. of 19-methylene-$\Delta^5$-androsten-3β-ol-17-one in 250 cc. of thiophene-free benzene was treated with 27.5 cc. of 4 N methylmagnesium bromide in ether and the mixture refluxed with the exclusion of moisture for 3 hours. The cooled mixture was cautiously treated with excess aqueous ammonium chloride solution and the product isolated by ethyl acetate extraction. The extract was washed with water, dried over anhydrous sodium sulfate and evaporated to dryness.

Recrystallization from methylene chloridehexane afforded 17α - methyl - 19 - methylene - $\Delta^5$ - androstene-3β,17β-diol.

19-ethylidene-$\Delta^5$-androsten-3β-ol-17-one was treated by the same procedure, to give 17α-methyl-19-ethylidene-$\Delta^5$-androsten-3β,17β-diol.

*Example VIII*

19-methylene-$\Delta^5$-androsten-3β-ol-17-one and 19-ethylidene-$\Delta^5$-androsten-3β-ol-17-one, were treated following the procedure described in Example VII, except that vinyl magnesium bromide was used instead of methyl magnesium bromide, yielding respectively: 17α-vinyl-19-methylene-$\Delta^5$-androstene-3β,17β-diol, and 17α-vinyl-19-ethylidene-$\Delta^5$-androstene-3β,17β-diol.

*Example IX*

19-methylene-$\Delta^5$-androsten-3β-ol-17-one and 19-ethylidene-$\Delta^5$-androsten-3β-ol-17-one, were treated in accordance with Example VIII, except that methyl magnesium bromide was substituted by ethinyl magnesium bromide, thus affording respectively: 17α-ethinyl-19-methylene-$\Delta^5$-androstene-3β,17β-diol, and 17α-ethinyl-19-ethylidene-$\Delta^5$-androstene-3β,17β-diol.

*Example X*

A solution of 2 g. of sodium borohydride in 30 cc. of methanol was added with stirring to a solution of 2 g. of 19-methylene-$\Delta^5$-androsten-3β-ol-17-one in 40 cc. of tetrahydrofuran. The mixture was kept at room temperature overnight, the excess reagent was decomposed by addition of acetic acid, the resulting solution concentrated to small volume in vacuo and diluted with water. The product was extracted with ethyl acetate, the extract washed with water, dried and evaporated. Crystallization of the solid from acetone-hexane gave 19-methylene-$\Delta^5$-androstene-3β,17β-diol.

By the same procedure, 19-ethylidene-$\Delta^5$-androsten-3β-ol-17-one, was converted into 19-ethylidene-$\Delta^5$-androstene-3β,17β-diol.

*Example XI*

A mixture of 1 g. of 19-methylene-$\Delta^5$-androstene-3β,17β-diol, 4 cc. of pyridine and 2 cc. of acetic anhydride was kept at room temperature overnight, poured into ice water, the formed precipitate was filtered, washed with water and dried. Crystallization from acetone-hexane gave 19-methylene-$\Delta^5$-androstene-3β,17β-diol-diacetate.

The starting compounds listed under A were treated by the same procedure, giving the corresponding products set forth under B.

| A | B |
|---|---|
| 19-ethylidene-Δ⁵-androstene-3β, 17β-diol. | 19-ethylidene-Δ⁵-androstene 3β, 17β-diol diacetate. |
| 17α-methyl-19-methylene-Δ⁵-androstene-3β, 17β-diol. | 17α-methyl-19-methylene-Δ⁵-androstene-3β, 17β-diol 3-acetate. |
| 17α-methyl-19-ethylidene-Δ⁵-androstene-3β, 17β-diol. | 17α-methyl-19-ethylidene-Δ⁵-androstene-3β, 17β-diol 3-acetate. |
| 17α-vinyl-19-methylene-Δ⁵-androstene-3β, 17β-diol. | 17α-vinyl-19-methylene-Δ⁵-androstene-3β, 17β-diol 3-acetate. |
| 17α-vinyl-19-ethylidene-Δ⁵-androstene-3β, 17β-diol. | 17α-vinyl-19-ethylidene-Δ⁵-androstene-3β, 17β-diol 3-acetate. |
| 17α-ethinyl-19-methylene-Δ⁵-androstene-3β, 17β-diol. | 17α-ethinyl-19-methylene-Δ⁵-androstene-3β, 17β-diol 3-acetate. |
| 17α-ethinyl-19-ethylidene-Δ⁵-androstene-3β, 17β-diol. | 17α-ethinyl-19-ethylidene-Δ⁵-androstene-3β, 17β-diol 3-acetate. |

*Example XII*

To a solution of 5 g. of 17α-methyl-19-methylene-Δ⁵-androstene-3β,17β-diol in 100 cc. of anhydrous benzene there were added 1 g. of p-toluenesulfonic acid and 10 cc. of caproic anhydride and the mixture was allowed to stand for 24 hours at room temperature, poured into ice and water and the resulting mixture stirred to effect hydrolysis of the excess anhydride. The benzene layer was separated and washed with 10% sodium carbonate solution and water. Drying, evaporation and crystallization of the residue from ether-hexane produced 17α-methyl-19-methylene-Δ⁵-androstene-3β,17β-diol dicaproate.

The starting compounds listed under A were treated by the above procedure, to give the products disclosed under B.

| A | B |
|---|---|
| 17α-methyl-19-ethylidene-Δ⁵-androstene-3β, 17β-diol. | 17α-methyl-19-ethylidene-Δ⁵-androstene-3β, 17β-diol dicaproate. |
| 17α-vinyl-19-ethylidene-Δ⁵-androstene-3β, 17β-diol. | 17α-vinyl-19-ethylidene-Δ⁵-androstene-3β, 17β-diol dicaproate. |
| 17α-vinyl-19-methylene-Δ⁵-androstene-3β, 17β-diol. | 17α-vinyl-19-methylene-Δ⁵-androstene-3β, 17β-diol dicaproate. |
| 17α-ethinyl-19-ethylidene-Δ⁵-androstene-3β, 17β-diol. | 17α-ethinyl-19-ethylidene-Δ⁵-androstene-3β, 17β-diol dicaproate. |
| 17α-ethinyl-19-methylene-Δ⁵-androstene-3β, 17β-diol. | 17α-ethinyl-19-methylene-Δ⁵-androstene-3β, 17β-diol dicaproate. |

*Example XIII*

17α-methyl-19-methylene-Δ⁵-androstene-3β,17β-diol 3-acetate was treated according to Example XII, to give 17α-methyl-19-methylene-Δ⁵-androstene-3β,17β-diol 3-acetate-17-caproate.

*Example XIV*

A solution of 1 g. of 19-methylene-Δ⁵-androstene-3β,17β-diol in 80 cc. of toluene and 20 cc. of cyclohexanone was dried by distilling off 10 cc. of the solvent. A solution of 1 g. of aluminum isopropoxide dissolved in 7 cc. of anhydrous toluene was then added and the mixture was refluxed for 15 minutes; 4 cc. of acetic acid were added and the solvents removed by steam distillation. The product was extracted several times with ethyl acetate and the organic extracts washed with 5% hydrochloric acid solution, water, 10% sodium carbonate solution and water until neutral, dried over anhydrous sodium sulfate and evaporated to dryness. Crystallization from acetone-hexane afforded 19-methylene-Δ⁴-androsten-17β-ol-3-one.

Following the same procedure, the starting compounds listed under A were converted into the products set forth under B.

| A | B |
|---|---|
| 19-ethylidene-Δ⁵-androstene-3β,17β-diol. | 19-ethylidene-Δ⁴-androsten-17β-ol-3-one. |
| 17α-methyl-19-methylene-Δ⁵-androstene-3β,17β-diol. | 17α-methyl-19-methylene-Δ⁴-androsten-17β-ol-3-one. |
| 17α-methyl-19-ethylidene-Δ⁵-androstene-3β,17β-diol. | 17α-methyl-19-ethylidene-Δ⁴-androsten-17β-ol-3-one. |
| 17α-vinyl-19-methylene-Δ⁵-androstene-3β,17β-diol. | 17α-vinyl-19-methylene-Δ⁴-androsten-17β-ol-3-one. |
| 17α-vinyl-19-ethylidene-Δ⁵-androstene-3β,17β-diol. | 17α-vinyl-19-ethylidene-Δ⁴-androsten-17β-ol-3-one. |
| 17α-ethinyl-19-methylene-Δ⁵-androstene-3β,17β-diol. | 17α-ethinyl-19-methylene-Δ⁴-androsten-17β-ol-3-one. |
| 17α-ethinyl-19-ethylidene-Δ⁵-androstene-3β,17β-diol. | 17α-ethinyl-19-ethylidene-Δ⁴-androsten-17β-ol-3-one. |

*Example XV*

19-methylene-Δ⁴-androsten-17β-ol-3 one and 19-ethylidene-Δ⁴-androsten-17β-ol-3-one were treated in accordance with Example XI, thus giving respectively 19-methylene-Δ⁴-androsten-17β-ol-3-one acetate, and 19-ethylidene-Δ⁴-androsten-17β-ol-3-one acetate.

*Example XVI*

The starting compounds listed under A were treated by the procedure described in Example XII, giving the corresponding products set forth under B.

| A | B |
|---|---|
| 17α-methyl-19-methylene-Δ⁴-androsten-17β-ol-3-one. | 17α-methyl-19-methylene-Δ⁴-androsten-17β-ol-3-one caproate. |
| 17α-methyl-19-ethylidene-Δ⁴-androsten-17β-ol-3-one. | 17α-methyl-19-ethylidene-Δ⁴-androsten-17α-ol-3-one caproate. |
| 17α-vinyl-19-methylene-Δ⁴-androsten-17β-ol-3-one. | 17α-vinyl-19-methylene-Δ⁴-androsten-17β-ol-3-one caproate. |
| 17α-vinyl-19-ethylidene-Δ⁴-androsten-17β-ol-3-one. | 17α-vinyl-19-ethylidene-Δ⁴-androsten-17β-ol-3-one caproate. |
| 17α-ethinyl-19-methylene-Δ⁴-androsten-17β-ol-3-one. | 17α-ethinyl-19-methylene-Δ⁴-androsten-17β-ol-3-one caproate. |
| 17α-ethinyl-19-ethylidene-Δ⁴-androsten-17β-ol-3-one. | 17α-ethinyl-19-ethylidene-Δ⁴-androsten-17β-ol-3-one caproate. |

*Example XVII*

The starting compounds of the foregoing example were treated according to Example XII, except that caproic anhydride was substituted by propionic anhydride and enanthic anhydride, thus affording respectively the corresponding propionates and enanthates.

*Example XVIII*

19-methylene-Δ⁵-androsten-3β-ol-17-one, and 19-ethylidene-Δ⁵-androsten-3β-ol-17-one were treated according to Example XI, thus giving 19-methylene-Δ⁵-androsten-3β-ol-17-one acetate and 19-ethylidene-Δ⁵-androsten-3β-ol-17-one acetate.

I claim:

1. A compound of the following formula:

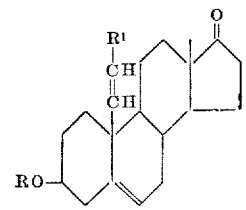

wherein R is selected from the group consisting of hydrogen and a hydrocarbon carboxylic acyl group of less than 12 carbon atoms and $R^1$ is a member of the group consisting of hydrogen and a lower alkyl group.

2. 19-methylene-Δ⁵-androsten-3β-ol-17-one.
3. 19-ethylidene-Δ⁵-androsten-3β-ol-17-one.

4. A compound of the following formula:

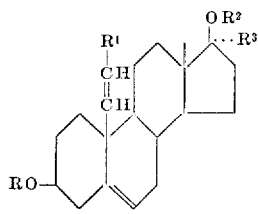

wherein R and R² are selected from the group consisting of hydrogen and a hydrocarbon carboxylic acyl group of less than 12 carbon atoms; R¹ is a member of the group consisting of hydrogen and a lower alkyl group and R³ is selected from the group consisting of hydrogen, lower alkyl, lower alkenyl and lower alkinyl.

5. 19-methylene-Δ⁵-androstene-3β,17β-diol.
6. 17α-methyl-19-methylene-Δ⁵-androstene-3β,17β-diol.
7. 17α-vinyl-19-methylene-Δ⁵-androstene-3β,17β-diol.
8. 17α-ethinyl-19-methylene-Δ⁵-androstene-3β,17β-diol.
9. 19-ethylidene-Δ⁵-androstene-3β,17β-diol.
10. 17α - methyl - 19-ethylidene-Δ⁵-androstene-3β,17β-diol.
11. 17α-vinyl-19-ethylidene-Δ⁵-androstene-3β,17β-diol.
12. 17α - ethinyl - 19-ethylidene-Δ⁵-androstene-3β,17β-diol.

13. A compound of the following formula:

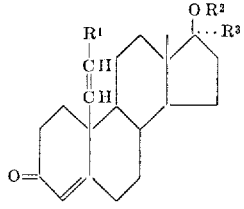

wherein R¹ is a member of the group consisting of hydrogen and a lower alkyl group; R² is selected from the group consisting of hydrogen and a hydrocarbon carboxylic acyl group of less than 12 carbon atoms and R³ is selected from the group consisting of hydrogen, lower alkyl, lower alkenyl and lower alkinyl.

14. 19-methylene-Δ⁴-androsten-17β-ol-3-one.
15. 19-ethylidene-Y⁴-androsten-17β-ol-3-one.
16. 17α - methyl - 19-methylene-Δ⁴-androsten-17β-ol-3-one.
17. 17α-vinyl-19-methylene-Δ⁴-androsten-17β-ol-3-one.
18. 17α - methyl - 19-ethylidene-Δ⁴-androsten-17β-ol-3-one.
19. 17α - ethinyl - 19-ethylidene-Δ⁴-androsten-17β-ol-3-one.
20. 17α-vinyl-19-ethylidene-Δ⁴-androsten-17β-ol-3-one.

No references cited.

UNITED STATES PATENT OFFICE
CERTIFICATE OF CORRECTION

Patent No. 3,102,127                                  August 27, 1963

Albert Bowers

It is hereby certified that error appears in the above numbered patent requiring correction and that the said Letters Patent should read as corrected below.

Column 8, line 18, claim 15, for "$-Y^4$-androsten-" read -- $-\Delta^4$-androsten- --.

Signed and sealed this 25th day of February 1964.

(SEAL)
Attest:
ERNEST W. SWIDER                                 EDWIN L. REYNOLDS Attesting Officer                                    Acting Commissioner of Patents